United States Patent
Seltzer et al.

(10) Patent No.: US 8,700,394 B2
(45) Date of Patent: Apr. 15, 2014

(54) ACOUSTIC MODEL ADAPTATION USING SPLINES

(75) Inventors: Michael Lewis Seltzer, Seattle, WA (US); Kaustubh Prakash Kalgaonkar, Atlanta, GA (US); Alejandro Acero, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 819 days.

(21) Appl. No.: 12/730,270

(22) Filed: Mar. 24, 2010

(65) Prior Publication Data

US 2011/0238416 A1 Sep. 29, 2011

(51) Int. Cl.
G10L 15/20 (2006.01)
G10L 15/00 (2013.01)
G10L 15/04 (2013.01)
G10L 15/28 (2013.01)

(52) U.S. Cl.
USPC ............................ 704/233; 704/251; 704/255

(58) Field of Classification Search
USPC .................................................. 704/231–257
See application file for complete search history.

(56) References Cited

U.S. PATENT DOCUMENTS

| | | | |
|---|---|---|---|
| 5,148,489 A | 9/1992 | Erell et al. | |
| 5,487,129 A | 1/1996 | Paiss et al. | |
| 5,978,824 A * | 11/1999 | Ikeda | 708/322 |
| 6,490,557 B1 | 12/2002 | Jeppesen | |
| 6,928,407 B2 | 8/2005 | Ponceleon et al. | |
| 8,015,002 B2 * | 9/2011 | Li et al. | 704/226 |
| 2003/0050767 A1 * | 3/2003 | Bar-Or | 702/189 |
| 2004/0066940 A1 * | 4/2004 | Amir | 381/94.2 |
| 2005/0015252 A1 * | 1/2005 | Marumoto | 704/234 |
| 2006/0136203 A1 * | 6/2006 | Ichikawa | 704/226 |
| 2008/0010065 A1 | 1/2008 | Bratt et al. | |

OTHER PUBLICATIONS

Du et al. "A Speech Enhancement Approach Using Piecewise Linear Approximation of an Explicit Model of Environmental Distortions". In Proc. Interspeech, Brisbane, Australia, Sep. 2008, pp. 569-572.*
Brand, et al., "oupled Hidden Markov Models for Complex Action Recognition", Retrieved at << http://citeseerx.ist.psu.edu/viewdoc/download?doi=10.1.1.31.611&rep=repl&type=pdf>>, IEEE Computer Society Conference on Computer Vision and Pattern Recognition , 1997, pp. 1-6.
Varga, et al., "Hidden Markov Model Decomposition of Speech and Noise", Retrieved at <<http://www.dcs.shef.ac.uk/~roger/publications/Varga%20-%20Hidden%20Markov%20model%20decomposition%20of%20speech%20and%20noise.pdf>>, 1990, pp. 845-848.

(Continued)

*Primary Examiner* — Jesse Pullias
(74) *Attorney, Agent, or Firm* — Steve Wight; Carole Boelitz; Micky Minhas (57) ABSTRACT

Described is a technology by which a speech recognizer is adapted to perform in noisy environments using linear spline interpolation to approximate the nonlinear relationship between clean speech, noise, and noisy speech. Linear spline parameters that minimize the error between predicted noisy features and actual noisy features are learned from training data, along with variance data that reflect regression errors. Also described is compensating for linear channel distortion and updating noise and channel parameters during speech recognition decoding.

20 Claims, 6 Drawing Sheets

(56) References Cited

OTHER PUBLICATIONS

Bregler, et al., "Nonlinear Manifold Learning for Visual Speech Recognition", Retrieved at << http://nsl.snu.ac.kr/2004_2_image/nonlinear%20model/chap8/%5B11%5D.pdf >>, , Proceedings of the Fifth International Conference on Computer Vision ICCV, 1995, pp. 494-499.

Hirsch, et al., "Noise Estimation Techniques for Robust Speech Recognition", Retrieved at <<http://194.94.121.162/papers/icassp95.pdf >>, International Conference on 1995, Acoustics, Speech, and Signal Processing, vol. 1. , pp. 4.

Deng, et al., "Large Vocabulary Speech Recognition under Adverse Acoustic Environments ", Retrieved at <<http://209.85.229.132/search?q=cache:w714oFCluYkJ:research.microsoft.com/pubs/76541/2000-deng-icslp.pdf+Large+vocabulary+speech+recognition+under+adverse+acoustic+environments&cd=1&hl=en&ct=clnk&gl=in >>, Dec. 1, 2009, pp. 6.

Gong, Yifan, "A Method of Joint Compensation of Additive and Convolutive Distortions for Speaker-Independent Speech Recognition", Retrieved at <<http://ieeexplore.ieee.org/stamp/stamp.jsp?tp=&isnumber=&arnumber=1495479&tag=1 >>, IEEE Transactions on Speech and Audio Processing, vol. 13, No. 5, Sep. 2005, pp. 975-983.

Dempster, et al., "Maximum Likelihood from Incomplete Data via the EM algorithm ", Retrieved at <<http://web.mit.edu/6.435/www/Dempster77.pdf >>, Journal of the Royal Statistical Society, vol. 39, No. 1, 1977, pp. 39.

Kim, et al., "Speech Recognition in Noisy Environments using First Order Vector Taylor Series ", Retrieved at <<http://citeseerx.ist.psu.edu/viewdoc/download;jsessionid=082998A36620BF1339F7D7939BBOFDFD?doi=10.1.1.51.3179&rep=rep1&type=url&i=0>>, vol. 24, 1998, Speech Communication, pp. 41-49.

Deng, et al., "Recursive Estimation of Nonstationary Noise Using Iterative Stochastic Approximation for Robust Speech Recognition", Retrieved at <<http://research.microsoft.com/pubs/63607/2003-deng-trans.pdf>>, Speech Communication, vol. 24, 1998, pp. 1-13.

Moreno, Pedra J., "Speech Recognition in Noisy Environments", Retrieved at <<http://www.cs.cmu.edu/~robust/Thesis/pjm_thesis.pdf >>, Apr. 22, 1996, pp. 130.

Leggetter, et al., "Maximum Likelihood Linear Regression for Speaker Adaptation of Continuous Density HMMs", Retrieved at <<http://citeseerx.ist.psu.edu/viewdoc/download?doi=10.1.1.89.2050&rep=rep1&type=pdf>>, Computer Speech and Language, 1995, vol. 9, pp. 171-185.

Gales, M.J.F. "Maximum Likelihood Linear Transformations for HMM-Based Speech Recognition", Retrieved at <<http://citeseerx.ist.psu.edu/viewdoc/download?doi=10.1.1.21.444&rep=rep1&type=pdf >>, May 1997, pp. 19.

Cui, et al., "Noise Robust Speech Recognition using Feature Compensation Based on Polynomial Regression of Utterance SNR", Retrieved at <<http://collaboration.ece.gatech.edu/ee/uploads/c/cf/Cui_AURORA2.pdf >>,, IEEE Transactions on Speech and Audio Processing, vol. 13, No. 6, Nov. 2005, pp. 1161-1172.

Pearce, et al., "The Aurora Experimental Framework for the Performance Evaluation of Speech Recognition Systems under Noisy Conditions", Retrieved at <<http://dnt.kr.hs-niederrhein.de/papers/icslp2000_final_footer.pdf >>, 6th International Conference on Spoken Language Processing, pp. 4, 2000.

Gales, Mark John Francis, "Model-Based Techniques for Noise Robust Speech Recognition", Retrieved at <<http://citeseerx.ist.psu.edu/viewdoc/download?doi=10.1.1.64.2016&rep=rep1&type=pdf >>, Sep. 1995, pp. 132.

Julier, Simon J., "The Spherical Simplex Unscented Transformation", Retrieved at <<http://ieeexplore.ieee.org/stamp/stamp.jsp?tp=&isnumber=&arnumber=1243439 >>, 2003, IEEE, pp. 2430-2434.

Julier, et al., "Unscented Filtering and Nonlinear Estimation", Retrieved at <<http://citeseerx.ist.psu.edu/viewdoc/download?doi=10.1.1.136.6539&rep=rep1&type=pdf>>, Proceedings of the IEEE, vol. 92, No. 3, Mar. 2004, pp. 401-422.

Nadas, et al., "Speech Recognition using Noise-Adaptive Prototypes", Retrieved at <<http://ieeexplore.ieee.org/stamp/stamp.jsp?tp=&isnumber=&arnumber=196633 >>, 1988, IEEE, pp. 517-520.

Rose, et al., "Integrated Models of Signal and Background with Application to Speaker Identification in Noise", Retrieved at <<http://www.ece.mcgill.ca/~rrose1/papers/rose_hoff_reynolds_sap94.pdf >>, IEEE Transactions on Speech and Audio Processing, vol. 2, No. 2, Apr. 1994, pp. 245-257.

Gales, et al., "Robust Continuous Speech Recognition Using Parallel Model Combination", Retrieved at <<http://ieeexplore.ieee.org/stamp/stamp.jsp?tp=&isnumber=&arnumber=536929&tag=1 , IEEE Transactions on Speech and Audio Processing, vol. 4, No. 5, Sep. 1996, pp. 352-359.

Deng, et al., "Enhancement of Log Mel Power Spectra of Speech Using a Phase-Sensitive Model of the Acoustic Environment and Sequential Estimation of the Corrupting Noise", Retrieved at <<http://research.microsoft.com/pubs/63604/2004-deng-sapb.pdf >>, IEEE Transactions on Speech and Audio Processing, vol. 12, No. 2, Mar. 2004, pp. 133-143.

Gales, et al., "Mean and Variance Adaptation within the MLLR Framework", Retrieved at <<http://citeseer.ist.psu.edu/cache/papers/cs/22859/http:zSzzSzsvr-www.eng.cam.ac.ukzSz~mjfgzSzvar_CSL.pdf/gales96mean.pdf >>, Apr. 1996, pp. 27.

Dalen, et al., "Extended VTS for Noise-Robust Speech Recognition", Retrieved at <<http://mi.eng.cam.ac.uk/~rcv25/pdf/van_dalen_icassp2009.pdf >>, pp. 4, 2009.

Deng, et al., "Large-Vocabulary Speech Recognition under Adverse Acoustic Environments", Retrieved at <<http://research.microsoft.com/pubs/76541/2000-deng-icslp.pdf >>, pp. 4, 2000.

Macho, et al. "Evaluation of a Noise-Robust DSR Front-End on Aurora Databases", Retrieved at http:// thamakau.usc.edu/Proceedings/ICSLP/%202002/ICLSP/PDF/AUTHOR/SL021969.PDF, Retrieved Date: Dec. 1, 2009, pp. 17-20.

Acero, et al., "HMM Adaptation using Vector Taylor Series for Noisy Speech Recognition ", Retrieved at http://research.microsoft.com/pubs/76536/2000-alexac-icsIpb.pdf, Retrieved Date: Dec. 1, 2009, 4 pages.

Liao, et al., "Adaptive Training with Joint Uncertainty Decoding for Robust Recognition of Noisy Data", Retrieved at http://citeseerx.ist.psu.edu/viewdoc/download?doi=10.1.1.65.4917&rep=rep1&type=pdf, Retrieved Date: Dec. 1, 2009, 4 pages.

Li, et al., "Incremental Online Feature Space Mllr Adaptation for Telephony Speech Recognition", Retrieved at http://citeseemist.psu.edu/viewdoc/download?doi=10.1.1.136.6516&rep=rep1Mype=pdf , Retrieved Date: Dec. 1, 2009, 4 pages.

Saon, et al., "Robust Digit Recognition in Noisy Environments: The IBM Aurora 2 System ", Retrieved at http://thamakau.usc.edu/Proceedings/Eurospeech%202001/papers/page629.pdf, Retrieved Date: Dec. 1, 2009, 4 pages.

Saon, et al., "Linear Feature Space Projections for Speaker Adaptation", Retrieved at http://citeseerx.ist.psu.edu/viewdoc/download?doi=10.1.1.28.8580&rep=rep1type=pdf, Retrieved Date: Dec. 1, 2009, 4 pages.

Moreno, et al., "A Vector Taylor Series Approach for Environment-Independent Speech Recognition". Retrieved at http://citeseerx.ist.psu.edu/viewdoc/download?doi=10.1.1.64.4615&rep=rep1&type=pdf, Retrieved Date: Dec. 1, 2009, 5 pages.

Young, et al., "The HTK Book", Retrieved at http://citeseerx.ist.psu.edu/viewdoc/download? doi=10.1.1.124.3972&rep=rep1type=pdf , Retrieved Date: Dec. 1, 2009, 355 pages.

Varga, et al., "Hidden Markov Model Decomposition of Speech and Noise", Retrieved at http://ieeexplore.ieee. org/stamp/stamp.jsp?tp=&isnumber=&arnumber=115970 , Retrieved Date: Dec. 1, 2009, pp. 845-848.

Li, et al., "High-Performance HMM Adaptation with Joint Compensation of Additive and Convolutive Distortions via Vector Taylor Series ", Retrieved at http://users.ece.gatech.edu/jinyuli/resume/asru07_JACVTS.pdf, Retrieved Date: Dec. 1, 2009, 6 pages.

(56) References Cited

OTHER PUBLICATIONS

Hu, et al., "An HMM Compensation Approach Using Unscented Transformation for Noisy Speech Recognition", Retreived at http://www.springerlink.com/content/h5531200j4088278/, Retrieved Date: Dec. 1, 2009, 12 pages.

Gales, et al., "An Improved Approach to the Hidden Markov Model Decomposition of Speech and Noise", IEEE, 1992, 4 pages.

Hu, et al., "Irrelevant Variability Normalization Based HMM Training Using VTS Approximation of an Explicit Model of Environmental Distortions", Interspeech 2007, Aug. 27-31, 2007, Antwerp, Belgium, pp. 1042-1045.

"Availability of Finnish SpeechDat-Car database for ETSI STQ QI008 front-end standardisation", Retrieved at http://aurora.hsnr.de/download/sdc_finnish_report1.pdf, STQ Aurora DSR Working Group, AU/217/99, Nokia, Nov. 16, 1999, 3 pages.

Kalgaonkar, et al., "Noise Robust Model Adaptation Using Linear Spline Interpolation", In Proceedings of ASRU, Trento, Italy, 2009, 6 pages.

Ertel, et al., "Some Algorithms for Linear Spline and Piecewise Multiple Linear Regression", Retrieved at http://www.jstor.org/stable/2285594, Journal of the American Statistical Association, vol. 71, No. 355, Sep. 1976, pp. 640-648.

Du, et al., "A Speech Enhancement Approach Using Piecewise Linear Approximation of an Explicit Model of Environmental Distortions", Interspeech, Sep. 22-26, 2008, Brisbane, Australia, pp. 569-572.

* cited by examiner

ACOUSTIC MODEL ADAPTATION USING SPLINES

BACKGROUND

Contemporary speech recognizers operate by having a large number of Gaussian distributions or the like. When audio corresponding to an utterance is input, the recognizer finds the best matching distributions based on training data, and uses those distributions to determine the words of the utterance.

As is well known, speech recognition systems tend to perform poorly in a noisy environment. One reason that speech recognizers fail in noisy environments is that the environmental conditions present in deployment differ from those seen in the training data.

Various compensation techniques have been attempted to reduce the mismatch between training and testing conditions and thus improve recognition accuracy. Generally there are two types of techniques, namely feature compensation techniques and model compensation techniques.

In feature compensation, the captured signal or the features extracted from the signal are processed prior to recognition to mitigate the effect of noise. These techniques are computationally efficient and do not require changes to the recognizer itself. However, they have the drawback that they make point estimates of the enhanced speech features, and errors in this estimation can cause further mismatch to the recognizer's acoustic models, further degrading performance.

Model compensation techniques avoid this problem by directly adapting the distributions inside the recognizer to better match the current environmental conditions. Such techniques may operate in a data driven fashion, although faster performance is typically achieved by methods that exploit the known relationship between clean speech, noise, and the resulting noisy speech.

However, model compensation is a challenging problem because the features that characterize these three quantities (clean speech, noise and noisy speech) are related nonlinearly. One option is to digitally mix the noise with the clean speech to produce noisy speech, and retrain the recognizer from scratch with the noisy speech. This results in improved accuracy, but is slow in computation time, and thus approximations have been attempted that are much faster to compute Several different approximation methods for handling this nonlinearity have been proposed. For example, Monte Carlo sampling has been used to generate samples from the constituent speech and noise distributions, which are then used to estimate the parameters of the resulting distribution of noisy speech. In Vector Taylor Series (VTS) adaptation, the nonlinear function that describes noisy speech features as a function of the clean speech and noise features is linearized around expansion points defined by the speech and noise models. Other model compensation techniques have been used; however regardless of which technique is used, there is still room for improvement.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a speech recognizer's speech parameters are adapted to a noisy environment based upon adaptation parameters of a spline model. The spline model, which may be trained from training data including clean speech and noise, approximates the nonlinear relationship between speech, noise and noisy speech parameters via a (e.g., linear) spline function. A variance parameter may be used to model spline regression error, and used in adapting the clean speech parameters.

In one implementation, the adapted speech recognizer parameters are computed by interpolating the parameters of the segments of the spline function. The interpolation weights are computed based upon a probability distribution representing the clean speech and the probability distribution representing the noise. The variance parameters of the spline functions can also be used to adapt the speech recognizer parameters.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards improving speech recognition via a data-driven technique for performing acoustic model adaptation to noisy environments. The technique uses linear spline (or another type of spline such as nonlinear, polynomial and so forth) regression to model the nonlinear function that describes noisy speech features as a function of the clean speech and noise features. As described below, the set of spline parameters that minimizes the error between the predicted and actual noisy speech features is learned from training data, and used at runtime to adapt cleanly trained acoustic model parameters to the current noise conditions.

It should be understood that any of the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and speech recognition in general.

Figure 1:
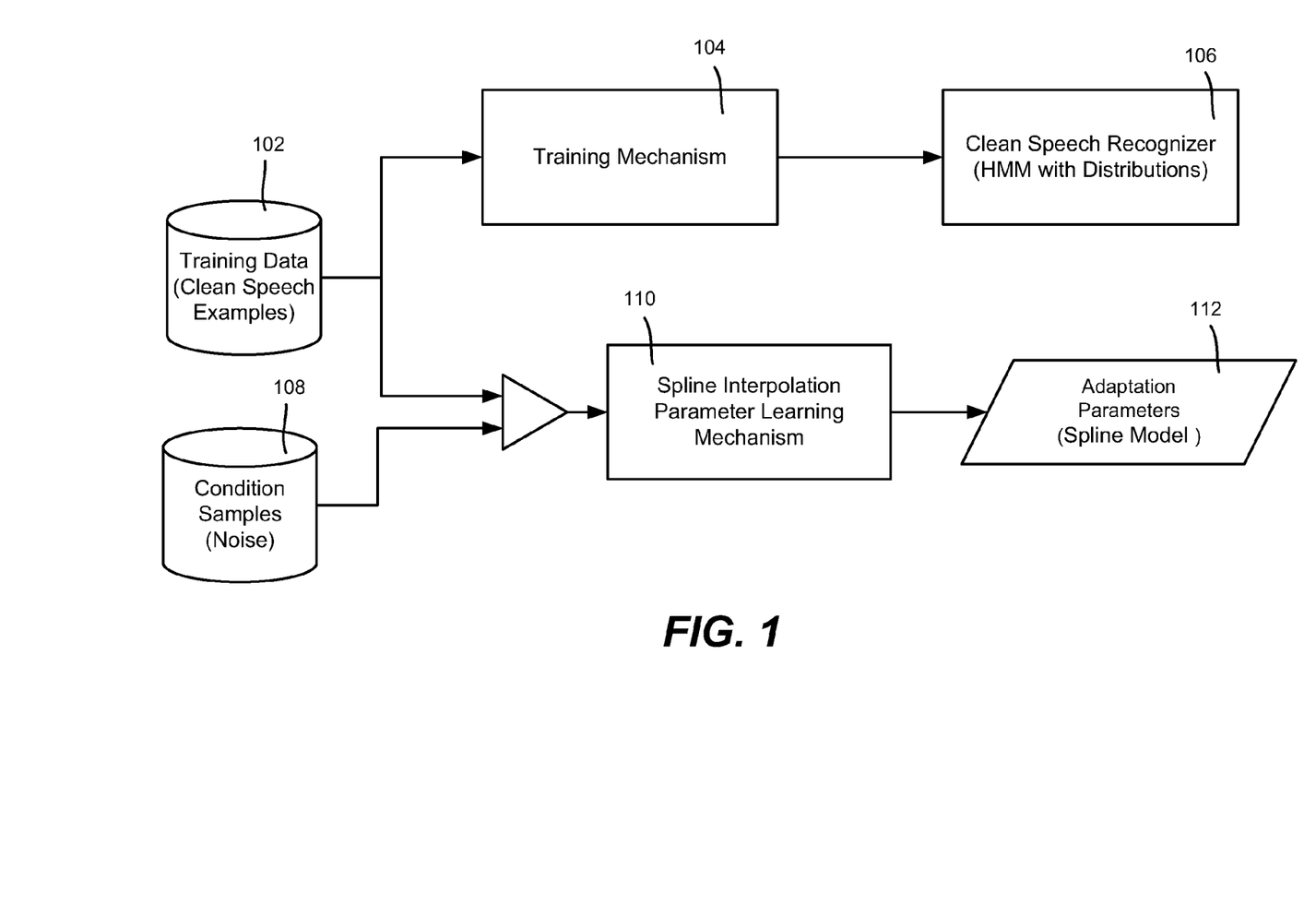
FIG. 1 is a block diagram showing example components for training a clean speech recognizer and learning a spline model comprising adaptation parameters.

FIG. 1 shows various aspects related to training a noise robust model for adaptation using linear spline interpolation. In general, training 102 data is used in a known manner by a training mechanism 104 to train a clean speech recognizer 106 (e.g., the Gaussian distributions of a Hidden Markov Model, or HMM type recognizer) in a clean speech environment.

The training data 102 is also mixed with condition examples 108, e.g., noise, which is then used by a spline interpolation parameter learning mechanism 110 to learn the adaptation parameters 112 (also referred to as the spline model), as described below. In one implementation, the parameters correspond to linear splines, however other spline functions may be alternatively used.

Figure 2:
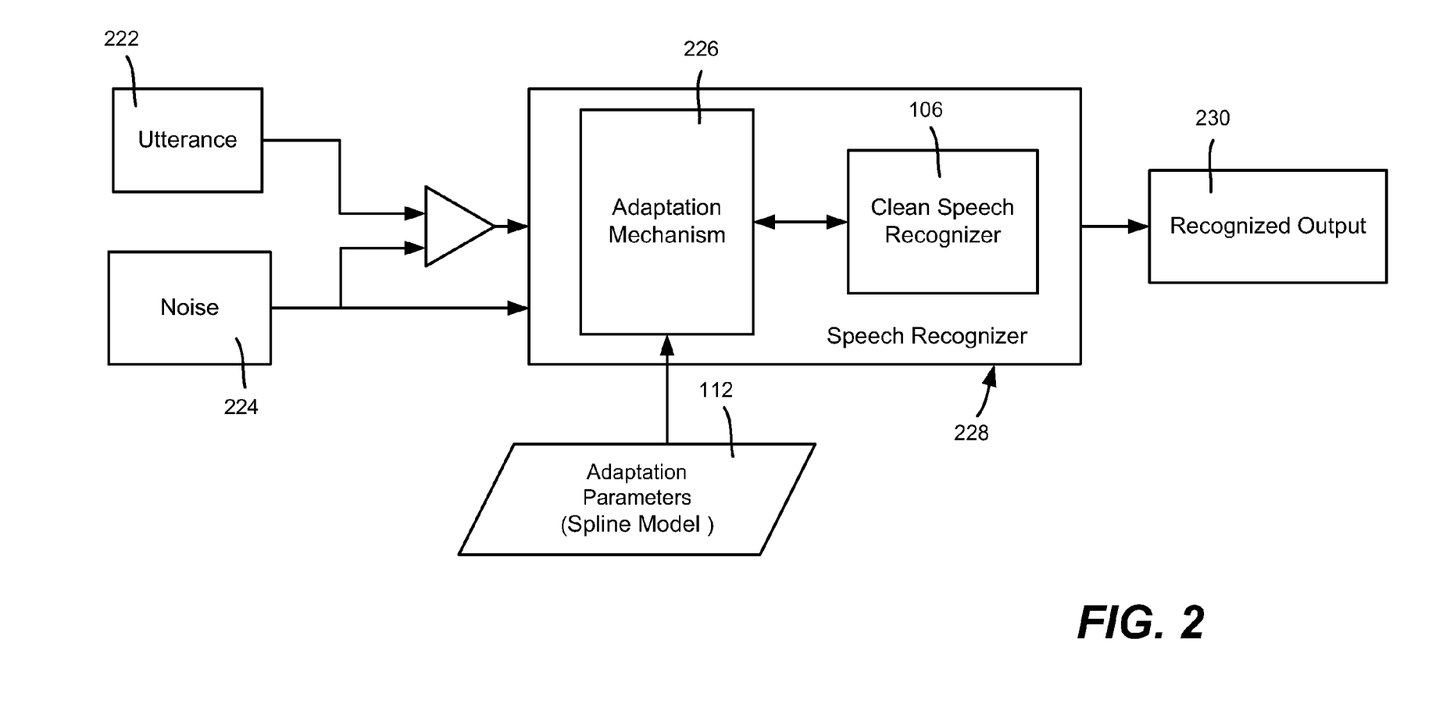
FIG. 2 is a block diagram showing example components for adapting clean speech parameters based upon noise using spline model adaptation parameters.

Once the adaptation parameters 112 are known, they may be used in an online, runtime environment as generally represented in FIG. 2 to help in recognizing an unknown utterance 222 in an environment with some amount of noise 224 that is arbitrary at any given time. In general and as described below, the appropriate parameters for the noise sample are selected from the available adaptation parameters 112 based upon one or more noise measurements that are input when the utterance 222 is not concurrent, e.g., sampled just before the utterance. Those selected parameters are then used by an adaptation mechanism 226 to adapt the distributions of the clean speech recognizer 106 to provide a noise adapted speech recognizer 228. The recognition result 230 is thus noise adapted distributions.

Figure 3:
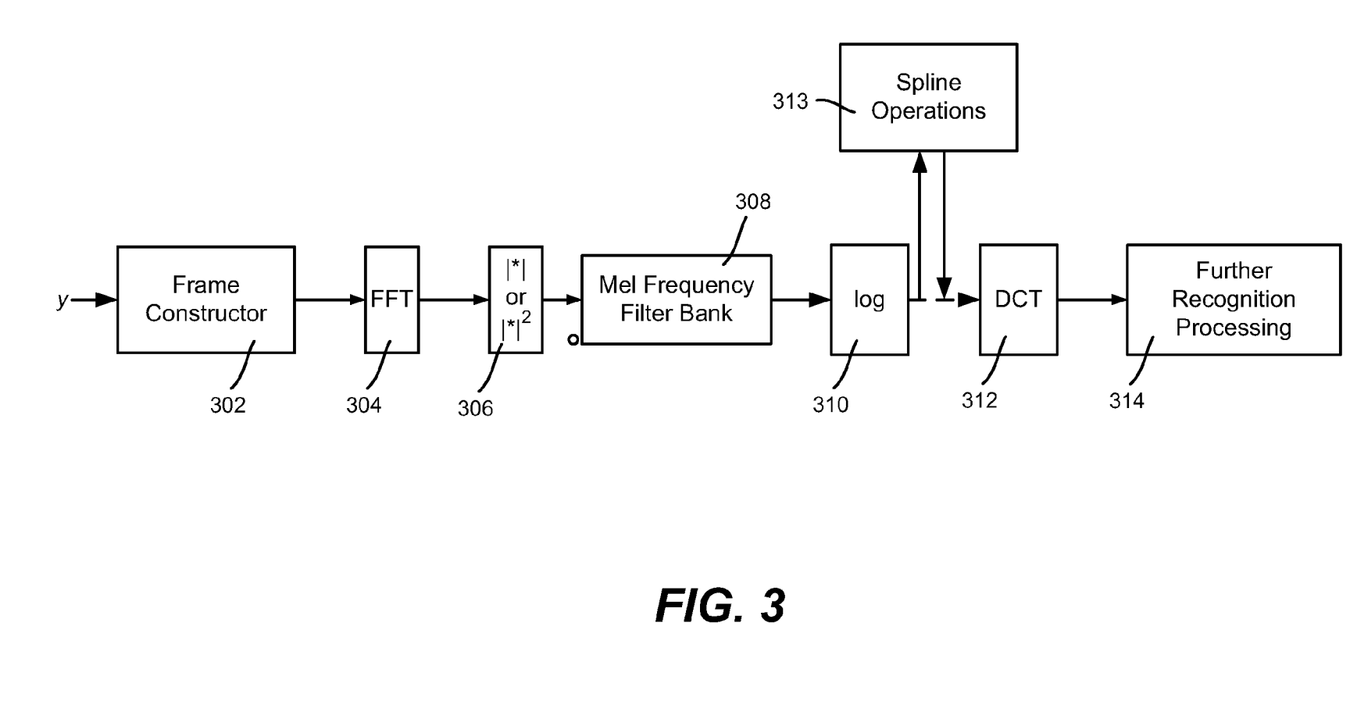
FIG. 3 is a block diagram showing how spline-related operations may be integrated into a speech recognition system.

FIG. 3 shows additional details of how linear spline interpolation is integrated into speech recognition technology. In FIG. 3, y represents the noisy speech, which is converted into a sequence of digital values that are grouped into frames in a known manner by a frame constructor 302 and passed through a fast Fourier transform (FFT) 304. The FFT 304 computes the phase and magnitude of a set of frequencies found in the frame. The magnitude or the square of the magnitude of each FFT is then processed by block 306.

In one implementation, the magnitude values are applied to a Mel-frequency filter bank 308, which applies perceptual weighting to the frequency distribution and reduces the number frequency bins that are associated with the frame; other frequency-based transforms may be used. When a Mel-frequency filter bank 308 is used, the observation vector is referred to as a Mel-Frequency Cepstral Coefficient (MFCC) vector.

A log function 310 may be applied to the values to compute the logarithm of-each frequency magnitude, and the logarithms of each frequency may be applied to a discrete cosine transform 312. As described below, the spline operations 313 are performed at this stage, (on a per-filter basis such that there is a subset of the adaptation parameters for each filter), essentially processing the DCT into another data form, performing spline-related processing, and then re-constructing the DCT. Further recognition processing 314 is then performed in a known manner.

Turning to details of the spline-related operations, in the presence of additive noise, the relationship between log mel spectra of speech, noise and noisy speech is nonlinear. The technology described herein models this nonlinear relationship using spline regression, which in one implementation is linear spline regression. In the offline training phase (FIG. 1), the set of spline parameters 112 that minimizes the error between the predicted and actual noisy speech features is learned from training data 102 in the presence of (e.g., noise) conditions 108. In the online runtime phase (FIG. 2), these parameters 112 are used to adapt clean acoustic model parameters of the clean speech recognizer 106 to the current noise 224 conditions.

Figure 4:
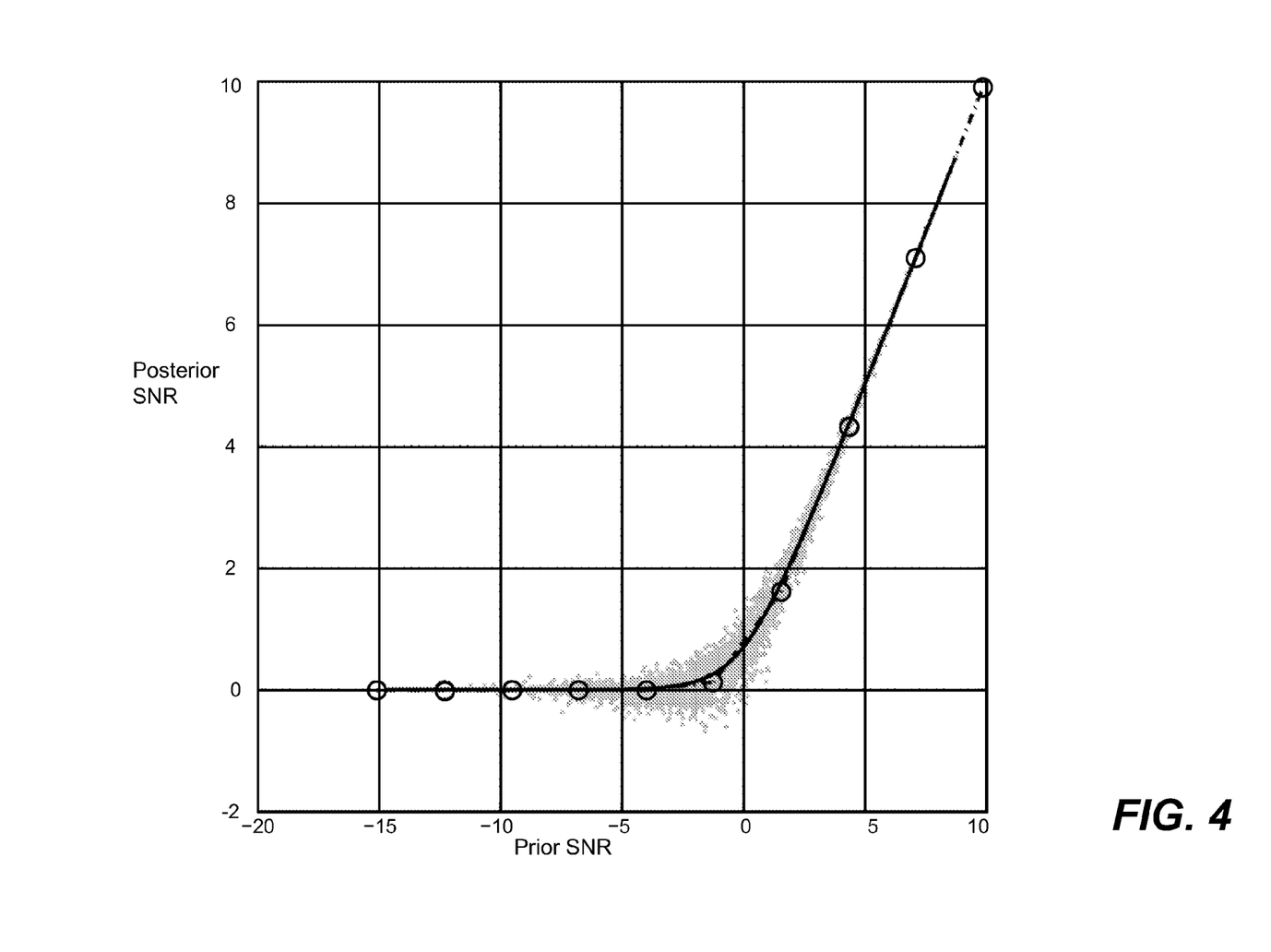
FIG. 4 is a representation of how a linear spline function may be used to approximate the nonlinear relationship between speech, noise and noisy speech, as well as how actual data varies from a mode representative of the nonlinear relationship.

More particularly, an HMM adaptation scheme interprets the nonlinear relationship between speech, noise and noisy speech as a nonlinear function between the prior SNR (signal to noise ratio) and the posterior SNR in the log mel filterbank domain. As generally represented in FIG. 4 and described below, this nonlinear function is then modeled as a series of linear segments using linear spline regression. Each segment is characterized with a set of spline parameters (slope and y-intercept) which characterize the line, and a variance that characterizes the uncertainty of the linear model in that segment. Adaptation is performed by applying a linear transform to the prior SNR to obtain the statistics of the posterior distribution. This transformation is determined by interpolating the linear spline parameters, as also described below. In this way, the parameters of the noisy speech distribution are determined from the distribution of the posterior SNR.

Note that the spline parameters are learned from the training data. Unlike other techniques, the lines are not restricted to be tangent to the theoretical line that defines the nonlinear relationship. Rather, the spline learning mechanism (algorithm) finds the set of parameters that minimizes the error between the predicted noisy speech features (determined by the model) and the actual noisy speech features.

Further, in one implementation, the spline model includes a variance for each spline segment that explicitly models the uncertainty that arises when transforming clean speech models to noisy speech models. This uncertainty comes from several sources, including the phase asynchrony between the clean speech and the additive noise. A second source of additional variance is the conversion from the cepstral domain to the log mel spectral domain that is typically performed using a pseudo-inverse of the Discrete Cosine Transform (DCT) matrix rather than an actual inverse DCT. Incorporating these two features into the spline model more accurately captures the inexact nature of the relationship between clean speech and noisy speech.

Let X, N, and Y be the spectra of clean speech, noise and noisy speech, respectively. The power spectrum of the noisy speech can be expressed as a function of the clean speech and the noise as shown in the equation below:

$$|Y|^2=|X|^2+|N|^2+2\cos(\theta)|X||N| \quad (1)$$

where $\theta$ is the relative phase between X and N. Most state-of-the-art speech recognizers use mel-frequency cepstral coefficients (MFCCs) or features derived from MFCCs. The cepstra are extracted from the power spectrum by first computing the energy at the output of each filter in the mel filterbank, and then applying a truncated DCT to the vector of log filterbank energies. If x, n, and y represent the cepstral coefficients extracted from the corresponding spectra of speech, noise, and noisy speech, the cepstra of the noisy speech can be expressed as:

$$y=n+C\log(1+e^{D(x-n)}+2\alpha e^{D(x-n)/2}) \quad (2)$$

where C is the truncated DCT matrix, D is the pseudo-inverse of C and $\alpha$ represents the contribution of the relative phase term in Equation (1) in the feature domain. Thus, the MFCC feature vector for noisy speech y is a non-linear function of the cepstra of clean speech x and the cepstra for the noise n and the relative phase between the clean speech and the noise.

If u=x−n is defined to be the prior SNR and v=y−n to be the a posterior SNR, Equation (2) can be rewritten as $$y-n=C\log(1+e^{D(x-n)}+2\alpha e^{D(x-n)/2}) \quad (3)$$

$$v=C\log(1+e^{Du}+2\alpha e^{Du/2}) \quad (4)$$

Most model adaptation or feature enhancement algorithms utilize the distortion model that assumes α=0 which further simplifies Equation (4) as $$v = C \log(1 + e^{Du}) \quad (5)$$

FIG. 4 shows a plot of u versus v for the fifteenth log mel spectral coefficient based on actual example training data. The plot shows the scatter of the true data (the gray dots), the mode of the nonlinear relationship (v=ln(1+exp(u))), (the black line) and the fitted spline with segments between the segment change points (the circles), referred to as knots. Because both the clean and multi-condition (noisy) training data are available, training can compute the features for clean speech, noise, and noisy speech, for all utterances in the training set.

Given samples of x, n, and y, u and v are computed for each input audio frame. The cloud of points in the scatter plot shows the influence of the relative phase term. The solid black line shows the mode of the data, which coincides with the α=0 condition given by Equation (5). As the figure shows, ignoring the effect of the relative phase term restricts other adaptation algorithms to the mode of the nonlinear relationship between the prior SNR and the posterior SNR, thereby ignoring the variance in the data.

In contrast, in one implementation of the spline interpolation method described herein, this variance is explicitly modeled, which leads to a more accurate model adaptation strategy. Details of modeling the variance are described below.

In linear spline regression, ordered (x,y) pairs of data are modeled by a series of non-overlapping segments in which the data in each segment is modeled by a linear regression. The regression parameters for each segment are computed under the constraint that adjacent regression lines intersect at the knots. In the linear spline regression method described herein, the relationship between the prior SNR u and the posterior SNR v expressed in Equation (4) is modeled using a linear spline regression composed of K line segments:

$$\begin{aligned}
v &= a_1 u + b_1 + \epsilon_1 & \forall\, u \leq U_1 \\
v &= a_2 u + b_2 + \epsilon_2 & \forall\, U_1 < u \leq U_2 \\
&\vdots \\
v &= a_k u + b_k + \epsilon_k & \forall\, U_{k-1} < u \leq U_k \\
&\vdots \\
v &= a_K u + b_K + \epsilon_K & \forall\, u > U_{K-1}
\end{aligned} \quad (6)$$

where $a_k$, $b_k$ and $\epsilon_k$ are the slope, y-intercept and regression error for the kth line segment, and $U_1, \ldots U_{K-1}$ are the K−1 knots that define the change points of the model. The regression error for each segment is modeled as a zero mean Gaussian with variance $\sigma_{\epsilon_k}^2$ and is assumed to be uncorrelated with x, n and y.

Note that there is generally an optimal number of segments with respect to providing the best adaptation performance for a given system. The adaptation performance does not necessarily improve by increasing the number of line segments of the spline, and indeed, the performance of the system starts deteriorating once the optimum is exceeded. The parameters of the spline may be estimated from the speech observations, without regard to the recognizer, however it is feasible to estimate the spline parameters within the recognizer training framework.

The choice of knot location may be significant, in that the localized variance of the data may be considered when selecting knots. In one implementation, the mode is modeled in the prior SNR interval of −5 to 5 dB with relatively more line segments; the variance of u versus v changes rapidly in this SNR range. Having more points in this range allows the algorithm to track these more rapid variance changes and improve the estimate of the posterior SNR.

Given the set of knot locations, the regression parameters are then computed. Note that while the regression error $\epsilon_k$ is assumed to be Gaussian, it readily apparent from the scatter plot shown in FIG. 4 that the data within a given segment is not Gaussian. Instead the regression is asymmetric, with more data lying below than above the mode. As a result, the regression parameters learned from the data may not accurately track the mode of the data.

To ensure that the linear spline regression tracks the mode, the method finds the linear regression parameters $\{a_k, b_k\}$ for each segment that minimize the mean squared error between the linear segment and the mode of the data. That is, in each segment, the following squared error is minimized:

$$\sum_{n=1}^{N_k} \{a_k u_n + b_k - \ln(1 + e^{u_n})\}^2, \quad U_{k-1} < u_n \leq U_k \quad (7)$$

where $N_k$ is the number of samples that lie in the kth spline segment. The K sets of regression parameters that minimize the error shown in Equation (7) for all segments and satisfy the constraints may be found by simultaneously solving a system of linear equations, in a known manner.

Once the parameters for the linear spline regression are estimated, they can be used to construct an MMSE (minimum mean square error) estimate of the noisy speech y from the clean speech x and the noise n. The MMSE estimator is based upon the computation of the conditional probability of v, which can be computed using Equation (9) (derived from equation (8)):

$$p(v, u) = \sum_{k=1}^{K} p(v \mid u, k) p(u) w_k \quad (8)$$

$$\Rightarrow p(v \mid u) = \sum_{k=1}^{K} p(v \mid u, k) w_k \quad (9)$$

where $w_k$ is the probability that the prior SNR u lies between the knots $U_{k-1} < u \leq U_k$. If it is assumed that the clean speech x and the noise n are independent Gaussian random variables, then the distribution of u=x−n is also Gaussian with mean $\mu_u = \mu_x - \mu_n$ and variance $\sigma_u^2 = \sigma_x^2 + \sigma_n^2$. Given the distribution of u, the probability $w_k$ is computed from the continuous density function (cdf) of u using Equation (10)

$$w_k = \int_{U_{k-1}}^{U_k} p(u) du = \Phi(U_k; \mu_u, \sigma_u^2) - \Phi(U_{k-1}; \mu_u, \sigma_u^2) \quad (10)$$

where $U_{k-1}$ and $U_k$ are the knots that bound the kth segment and $\Phi$ is the cdf of a Gaussian distribution. The conditional expectation of v can then be written using Equation (9):

$$E[v \mid u] = \int v p(v \mid u) dv = \sum_{k=1}^{K} w_k \int v p(v \mid u, k) dv \quad (11)$$

Note that one particular implementation sets K=1 and $w_1$=1, which results in faster computation.

Under the linear spline model, the posterior SNR v is a linear function of the prior SNR u for a given segment k, i.e., $v=a_k u+b_k$. This linear transform preserves the Gaussian nature of the random variable, which implies that both the joint distribution p(v,u) and the conditional distribution p(v|u) are Gaussian. With algebraic manipulation, the segment-conditional distribution of v in equation (11) can be written as:

$$p(v|u,k) = N(v; a_k u + b_k, \sigma_{\epsilon_k}^2). \tag{12}$$

The MMSE estimate of the a posterior SNR v may then be written as:

$$\hat{v} = \sum_k w_k (a_k u + b_k). \tag{13}$$

Because v=y−n, the MMSE estimate of y can be computed from equation (13) as:

$$\hat{y} = n + \sum_k w_k a_k (x-n) + \sum_k w_k b_k \tag{14}$$

$$= (1-\hat{a})n + \hat{a}x + \hat{b} \tag{15}$$

Equation (15) shows that the MMSE estimate of y under the linear spline interpolation model is a linear combination of x and n. As described below, this MMSE estimate of the noisy speech features y may be used to adapt the acoustic models of a speech recognizer trained on clean speech.

Turning to acoustic model adaptation using linear spline interpolation, as described above the MMSE estimate of y is computed based on knowledge of clean speech x and the noise n. In the model domain, the actual x and n are unknown, and thus modeled as Gaussian distributions p(x) and p(n). From these, an estimate of the parameters of the noisy speech distribution p(y) is desired, which is also Gaussian under the linear form of the estimate of y in equation (15).

The mean of y is computed by applying an expectation operator to both sides of Equation (14). The variance can then be computed from the second moment $E[y^2]$ and the estimate of the mean of y. This gives the following estimates of the mean and variance of p(y):

$$\mu_y = \left(1 - \sum_k w_k a_k\right)\mu_n + \left(\sum_k w_k a_k\right)\mu_x + \sum_k w_k b_k \tag{16}$$

$$\sigma_y^2 = \left(1 - \sum_k w_k a_k\right)^2 \sigma_n^2 + \left(\sum_k w_k a_k\right)^2 \sigma_x^2 + \sum_k w_k^2 \sigma_{\epsilon_k}^2 \tag{17}$$

These adaptation equations are valid for a single log mel filter bank component. If x, n and y are M-dimensional log mel spectral vectors modeled as Gaussians with means $\mu_x^l, \mu_n^l$ and $\mu_y^l$ and covariances $\Sigma_x^l, \Sigma_n^l$ and $\Sigma_y^l$ respectively, then the adaptation formulae for the mean and covariance of p(y) can be written as:

$$\mu_y^l = A\mu_x^l + (I-A)\mu_n^l + b \tag{18}$$

$$\Sigma_y^l = U\Sigma_x^l U^T + V\Sigma_n^l V^T + \Sigma_\epsilon \tag{19}$$

$$A = \text{diag}\left[\sum_k w_{1k} a_{1k}, \ldots, \sum_k w_{Mk} a_{Mk}\right]$$

$$b = \left[\sum_k w_{1k} b_{1k}, \ldots, \sum_k w_{Mk} b_{Mk}\right]^T$$

$$U = \text{diag}\left[\sum_k w_{1k} a_{1k}, \ldots, \sum_k w_{Mk} a_{Mk}\right]$$

$$V = \text{diag}\left[\left(1 - \sum_k w_{1k} a_{1k}\right), \ldots, \left(1 - \sum_k w_{Mk} a_{Mk}\right)\right]$$

$$\Sigma_\epsilon = \text{diag}\left[\sum_k w_{1k}^2 \sigma_{\epsilon_{1k}}^2, \ldots, \sum_k w_{Mk}^2 \sigma_{\epsilon_{Mk}}^2\right] \tag{20}$$

where $a_{mk}$, $b_{mk}$ and $\sigma_{\epsilon_{mk}}^2$ are the spline parameters for the kth spline segment of the mth mel coefficient. This notation is adopted for the parameters of the model.

Most speech recognition systems operate on cepstra, not log Mel spectra. To perform model adaptation on acoustic models trained from L-dimensional cepstra derived from M-dimensional log Mel spectra (L<M), splines need to be trained for all M mel filters. Transformation of the parameters between cepstra and mel spectra is performed using a truncated DCT $C \in R^{L \times M}$ and pseudo-inverse DCT $D \in R^{M \times L}$. The final update equations for cepstral domain parameters can then be expressed as $$\mu_y = \overline{A}\mu_x + (I-\overline{A})\mu_n + Cb \tag{21}$$

$$\Sigma_y = \overline{U}\Sigma_x \overline{U}^T + \overline{V}\Sigma_n \overline{V}^T + C\Sigma_\epsilon C^T \tag{22}$$

where $\overline{A}=CAD$ and similar notation is adopted for U and V. Even though $\Sigma_x, \Sigma_n$ are diagonal covariances, $\Sigma_y$ is full covariance. However, $\Sigma_y$ may be assumed to be diagonal, in order to be able to use a decoder that is optimized for diagonal covariances.

With respect to adaptation of the dynamic model parameters, as a consequence of representing the relationship between clean and noisy speech using a linear spline, the adaptation relationships among the dynamic components of x, n and y are similar to the statics components. First order difference coefficients are computed according to $\Delta y=y(t+\tau)-y(t-\tau)$. Assuming that the $w_k$'s do not change over a short time interval, this can be written as:

$$\Delta y = \sum_k w_k \Delta y_k \tag{23}$$

$$\Delta y = \Delta n \sum_k w_k (1-a_k) + \Delta x \sum_k w_k a_k + \sum_k w_k \dot{\epsilon}_k \tag{24}$$

where the $\dot{\epsilon}_k$ is a Gaussian with zero mean and variance $\sigma_{\dot{\epsilon}_k}^2 = 2\sigma_{\epsilon_k}^2$. The update equations for the Gaussian means and variances for the delta parameters are:

$$\mu_{\Delta y} = \overline{A}\mu_{\Delta x} + (I-\overline{A})\mu_{\Delta n} \tag{25}$$

$$\Sigma_{\Delta y} = \overline{U}\Sigma_{\Delta x}\overline{U}^T + \overline{V}\Sigma_{\Delta n}\overline{V}^T + C\Sigma_{\dot{\epsilon}} C^T \tag{26}$$

The update equations for the second order differences $\Delta\Delta y$ are similar to $\Delta y$. The only difference is that the variance of $\ddot{\epsilon}_k$ is $\sigma_{\ddot{\epsilon}_k}^2 = 4\sigma_{\epsilon_k}^2$. The update equations for the means and variances of the Gaussians of delta-delta parameters are:

$$\mu_{\Delta\Delta y} = \overline{A}\mu_{\Delta\Delta x} + (I-\overline{A})\mu_{\Delta\Delta n} \tag{27}$$

$$\Sigma_{\Delta\Delta y} = \overline{U}\Sigma_{\Delta\Delta x}\overline{U}^T + \overline{V}\Sigma_{\Delta\Delta n}\overline{V}^T + C\Sigma_{\ddot{\epsilon}} C^T \tag{28}$$

The improvement in estimating the variance of v is a direct result of incorporating the regression error $\epsilon$ as one of the parameters for the spline. This variance parameter not only accounts for the deviation from the mode, but also models the smearing that occurs due to the phase term present in the spectrum generated using the Fourier transform.

Turning to extending the linear spline interpolation algorithm, the adaptation scheme may be extended to compensate for the presence of linear channel distortion. Further, the noise and channel parameters can be updated during decoding in an unsupervised manner within the linear spline interpolation framework.

Linear spline interpolation was used to perform HMM adaptation for a fixed estimate of the noise parameters and no channel distortion $\mu_h=0$. The noise and channel parameters can be re-estimated in an unsupervised manner using a generalized EM (expectation maximization) approach, starting with the following auxiliary function:

$$Q(\lambda,\hat{\lambda}) = \Sigma_{t,s} \gamma_{ts} \log p(y_t|s,\lambda) \quad (29)$$

where $\gamma_{ts}$ is the posterior probability of Gaussian component s occurring at frame t given the observation sequence and $p(y_t|s,\lambda) = \mathcal{N}(y_t; \mu_{y,s}, \Sigma_{y,s})$ is the likelihood of the observation under the adapted linear spline interpolation model.

For the re-estimation of the noise and channel means, the re-estimation formulae for the noise mean can be determined by taking the derivative of equation (29) with respect to $\mu_n$ and setting the result equal to zero. Solving for $\mu_n$ obtains:

$$\mu_n = \left(\sum_{t,s} \gamma_{ts} G_s^T \Sigma_{y,s}^{-1} G_s\right)^{-1} \times \left(\sum_{t,s} \gamma_{ts} G_s^T \Sigma_{y,s}^{-1} (y_t - F_s(\mu_{x,s} + \mu_h) - e_s)\right) \quad (30)$$

Note that the transformation parameters have a subscript s to indicate they are a function of the Gaussian component. The update equation for the channel mean $\mu_h$ can be similarly computed as:

$$\mu_h = \left(\sum_{t,s} \gamma_{ts} F_s^T \Sigma_{y,s}^{-1} F_s\right)^{-1} \times \left(\sum_{t,s} \gamma_{ts} F_s^T \Sigma_{y,s}^{-1} (y_t - F_s \mu_{x,s} - G_s \mu_n - e_s)\right) \quad (31)$$

The re-estimation formulae for the means of the dynamic noise and channel parameters can be similarly computed. However, in one implementation it is assumed that the channel is fixed and the noise is stationary. As a result, the means of the dynamic noise and channel parameters are set equal to zero.

Turning to re-estimation of the noise variances, because there is no closed-form solution for the noise variance update, the variance is updated iteratively using Newton's method. The new estimate of the variance is computed as:

$$\Sigma_n^{new} = \Sigma_n [H(\Sigma_n)]^{-1} [\nabla Q(\Sigma_n)] \quad (32)$$

where $\mathcal{H}(\Sigma_n)$ is the Hessian matrix with elements defined as:

$$\mathcal{H}_{ij}(\Sigma_n) = \frac{\partial^2 Q}{\partial \sigma_n^2(i) \partial \sigma_n^2(j)} \quad (33)$$

Because the variances are not guaranteed to remain nonnegative, $\tilde{\Sigma}_n = \log(\Sigma_n)$ is optimized in practice. The expressions for the terms of the gradient and Hessian are set forth below:

$$\frac{\partial Q}{\partial \tilde{\sigma}_n^2(i)} = -\frac{1}{2} \sigma_n^2(i) \Sigma_{t,s} \gamma_{ts} \times \Sigma_d \left\{ \frac{G_s(d,i)^2}{\sigma_{y,s}^2(d)} \times \left(1 - \frac{(y_t(d) - \mu_{y,s}(d))^2}{\sigma_{y,s}^2(d)}\right) \right\} \quad (34)$$

$$\frac{\partial^2 Q}{\partial \tilde{\sigma}_n^2(i) \partial \tilde{\sigma}_n^2(j)} = \frac{1}{2} \sigma_n^2(i) \sigma_n^2(j) \Sigma_{t,s} \gamma_{ts} \times \quad (35)$$

$$\Sigma_d \left\{ \frac{G_s(d,i)^2 G_s(d,j)^2}{[\sigma_{y,s}^2(d)]^2} \left(1 - 2\frac{(y_t(d) - \mu_{y,s}(d))^2}{\sigma_{y,s}^2(d)}\right) - \delta(i-j) \Sigma_d \frac{G_s(d,i)^2}{\sigma_{y,s}^2(d)} \left(1 - \frac{(y_t(d) - \mu_{y,s}(d))^2}{\sigma_{y,s}^2(d)}\right) \right\}$$

This approach is also used to update the variances of the dynamic noise parameters $\Sigma_{\Delta n}, \Sigma_{\Delta\Delta n}$. The static, delta, and delta-delta components are assumed independent, so the Hessian matrices for each set of parameters can be computed independently.

Figure 5:
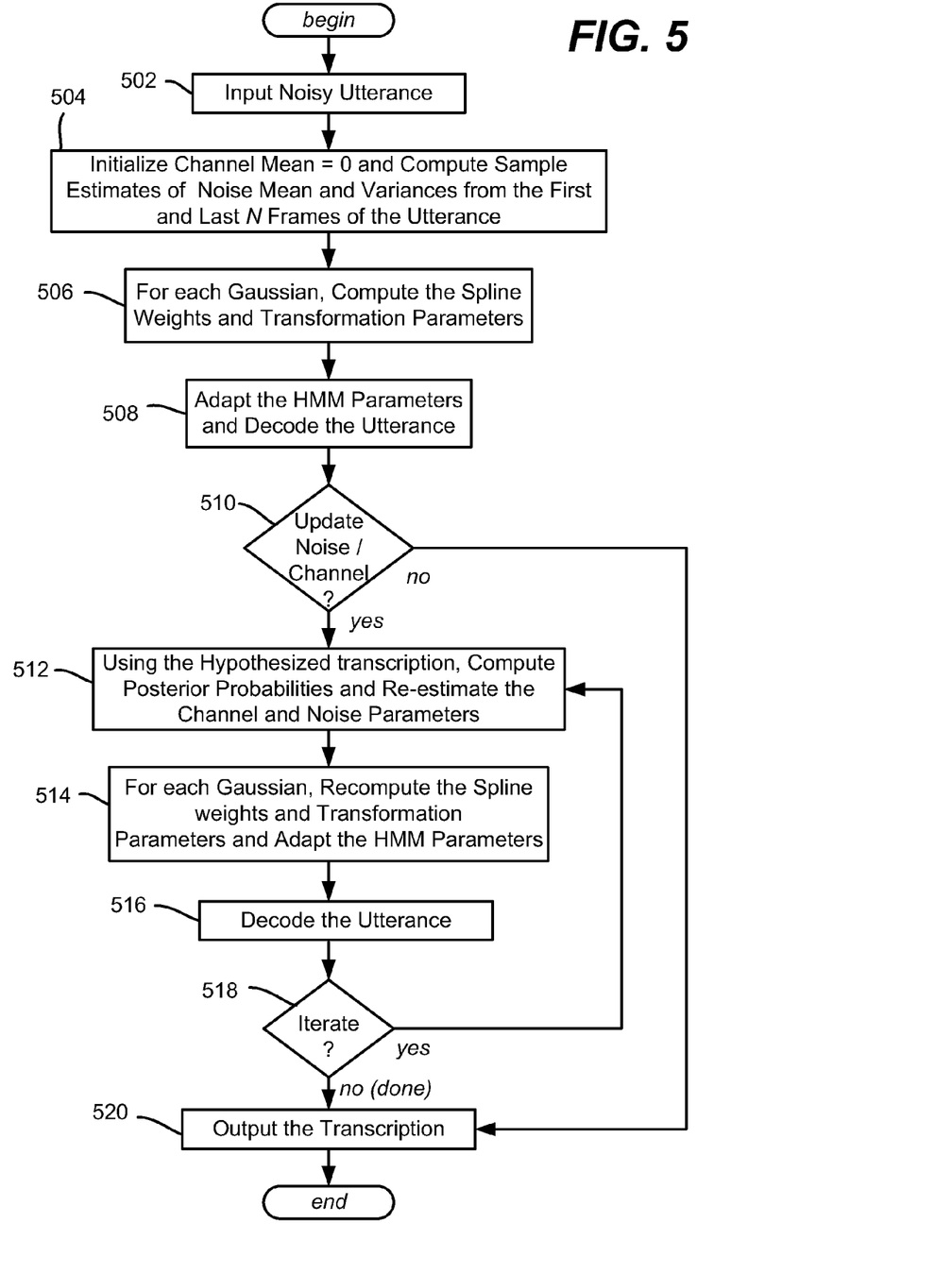
FIG. 5 is a flow diagram showing example steps that may be taken to adapt parameters of a clean speech mechanism based upon noise using a spline model.

FIG. 5 summarizes an example sequence of steps involved in performing model adaptation using linear spline interpolation, beginning at step 502 which reads in the noisy utterance. Step 504 initializes the channel mean $\mu_h$ to zero and computes sample estimates of $\{\mu_n, \Sigma_n, \Sigma_{\Delta n}, \Sigma_{\Delta\Delta n}\}$ from the first and last N frames of the utterance.

As represented by step 506, for each Gaussian, the spline weights $\{w_k\}$ and transformation parameters $\{F, G, e, \Sigma_\epsilon\}$ are computed. Step 508 adapts the HMM parameters and decodes the utterance. At this point, the decoded utterance may be output, or further updating of the noise and channel parameters from the initial estimate may be performed. Step 510 represents making this decision, and thus continues to step 512 as described below, or branches to step 520 to output the utterance based upon the initial estimate.

If updating is desired, using the hypothesized transcription, step 512 represents computing the posterior probabilities $\gamma_{st}$ and re-estimating the channel and noise parameters. As represented by step 514, for each Gaussian, the spline weights and transformation parameters are recomputed, and the HMM parameters adapted. Step 516 decodes the utterance following the updating.

The above set of sequence of steps may comprise a single iteration of generalized EM for updating the noise and channel parameters. However, multiple iterations of steps 512, 514 and 516 may be performed as desired, as represented via step 518; (note that in one implementation, three iterations of Newton's method were performed to update the noise variances). After the single or multiple iterations, step 520 outputs the transcription.

Note that it is feasible to share a given transformation for a number of Gaussians. This is another approximation that if used, may result in faster computation.

As can be seen, there is described aspects of adapting a speech recognizer trained on clean speech to a noisy environment. The mechanism/algorithm approximates the nonlinear mapping between speech, noise and noisy speech parameters using an interpolated linear spline regression learned from training data. The model for the spline further tries to accommodate the Uncertainty present in the true data with a variance parameter that also models the spline regression error.

Exemplary Operating Environment

Figure 6:
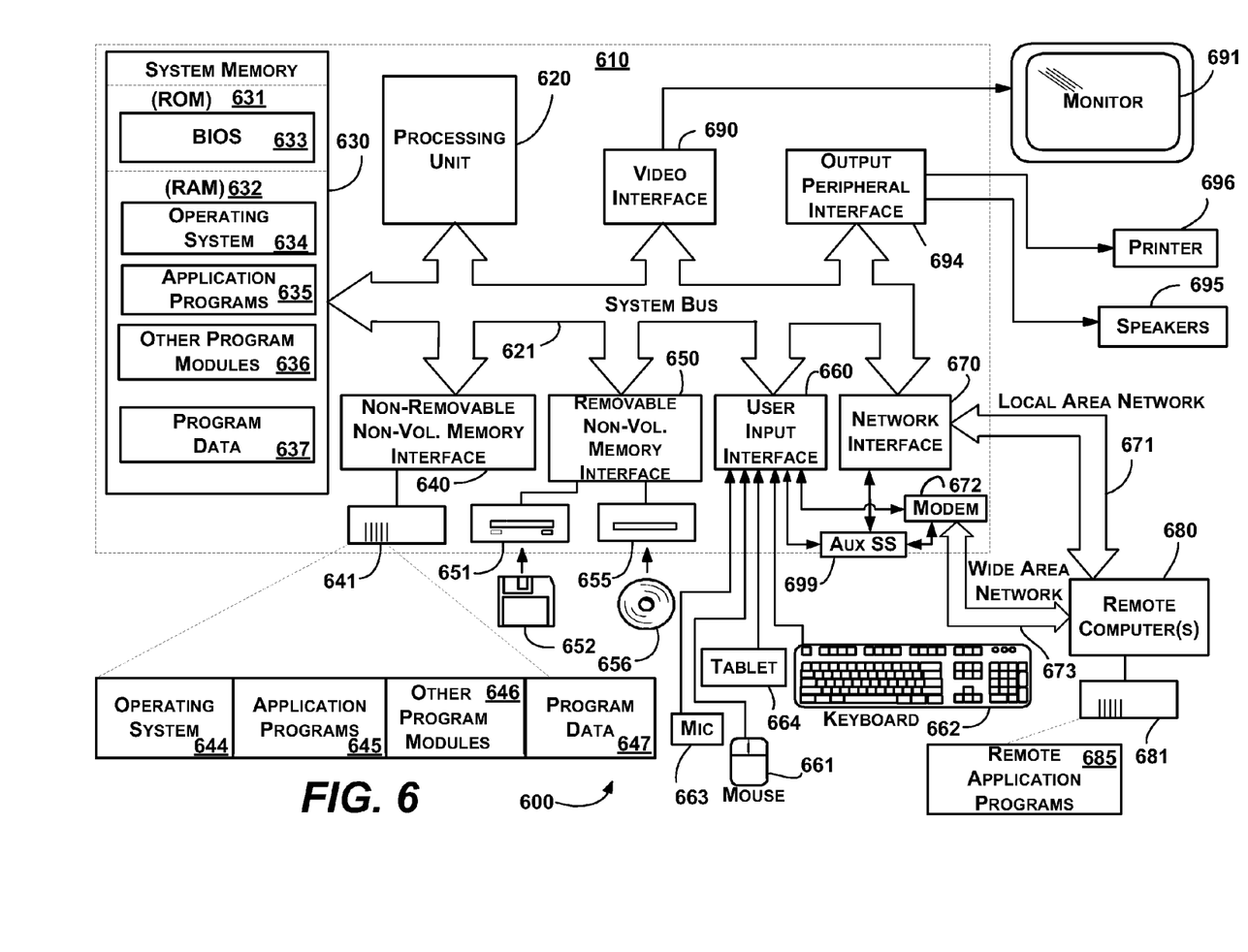
FIG. 6 shows an illustrative example of a computing environment into which various aspects of the present invention may be incorporated.

FIG. 6 illustrates an example of a suitable computing and networking environment 600 on which the examples of FIGS. 1-5 may be implemented. The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the exemplary operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an exemplary system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are exemplary and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method performed on at least one processor, comprising:
    adapting a speech recognizer to a noisy environment, including approximating a nonlinear relationship between speech, noise and noisy speech parameters by using a spline function to obtain adaptation parameters of a spline model, inputting noise and noisy speech, selecting a set of adaptation parameters from the spline model based upon the noise input, and using the adaptation parameters to adapt speech parameters for use in recognizing the noisy speech.

2. The method of claim 1 further comprising:
    using a variance parameters to model spline regression error, and including variance data corresponding to the variance parameter in the adaptation parameters of the spline model.

3. The method of claim 1 wherein approximating the nonlinear relationship comprises using a linear spline function having a plurality of linear segments.

4. The method of claim 1 wherein the nonlinear relationship corresponds to a mode, wherein the spline function corresponds to a plurality of segments, in which there are more segments at less linear parts of the mode and less segments at more linear parts of the mode.

5. The method of claim 1 wherein using the spline function to obtain the adaptation parameters comprises computing spline weights.

6. The method of claim 5 wherein computing the spline weights comprises interpolating the adaptation parameters corresponding to at least two segments of the spline function.

7. The method of claim 6 wherein interpolating the adaptation parameters comprises determining relative weights for the segments based upon a probability distribution representing the speech and a probability distribution representing the noise.

8. The method of claim 1 further comprising:
    learning the adaptation parameters based upon training data including speech examples and condition samples.

9. The method of claim 1 wherein selecting the set of adaptation parameters comprises selecting a subset for each filter of a filter bank.

10. The method of claim 1 further comprising:
    compensating for linear channel distortion.

11. The method of claim 1 further comprising:
    updating noise and channel parameters during speech recognition decoding.

12. In a computing environment, a system comprising:
    a speech recognizer, including a speech model having speech parameters learned from speech training data, and a spline model having adaptation parameters learned from the speech training data and noise samples, the spline model including a subset of the adaptation parameters for each frequency filter corresponding to a spline function for that frequency filter that approximates a nonlinear relationship between speech, noise and noisy speech parameters, the speech recognizer configured to receive noisy speech input, to select selected adaptation parameters based upon sampled noise, and to adapt the speech parameters using the selected adaptation parameters.

13. The system of claim 12 wherein the spline function comprises a linear spline having a plurality of linear segments.

14. The system of claim 12 wherein the adaptation parameters include variance parameters that model spline regression error.

15. The system of claim 12 wherein the noise corresponds to a probability distribution, wherein the speech parameters correspond to a probability distribution, and wherein adapting the speech parameters using the selected adaptation parameters comprises interpolating to compute data for adapting the speech parameters.

16. The system of claim 15 wherein the adaptation parameters include variance data that models spline regression error, and wherein the data for adapting the speech parameters is computed based in part on the variance data.

17. The system of claim 12 further comprising means for updating noise and channel parameters during speech recognition decoding.

18. One or more computer storage devices having computer-executable instructions, which when executed perform steps, comprising:
   (a) inputting a noisy utterance;
   (b) obtaining initial estimates of noise and channel parameters;
   (c) computing spline weights and transformation parameters based upon the estimates;
   (d) adapting speech parameters into adapted parameters based upon the spline weights and transformation parameters computed at step (c);
   (e) decoding the utterance based upon the adapted parameters; and
   (f) outputting data corresponding to the decoded utterance.

19. The one or more computer storage devices of claim 18 wherein the data corresponding to the decoded utterance is based on an updating of the estimates, including by having further computer-executable instructions between steps (e) and (f) comprising:
   (i) computing posterior probabilities and re-estimating the estimates;
   (ii) recomputing the spline weights and transformation parameters based upon the re-estimated estimates;
   (iii) adapting speech parameters into updated adapted parameters based upon the recomputed spline weights and transformation parameters recomputed at step (ii); and
   (iv) decoding the utterance based upon the updated adapted parameters.

20. The one or more computer storage devices of claim 18 having further computer-executable instructions comprising, iterating steps (i), (ii), (iii) and (iv) over a plurality of iterations.

* * * * *